United States Patent
Sucharczuk et al.

(10) Patent No.: US 6,452,708 B1
(45) Date of Patent: Sep. 17, 2002

(54) REVERSE DIGITIZED COMMUNICATIONS ARCHITECTURE

(75) Inventors: Guy Sucharczuk, Sunnyvale, CA (US); Krzysztof Pradzynski, Santa Clara, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 0 days.

(21) Appl. No.: 09/481,780

(22) Filed: Jan. 11, 2000

(51) Int. Cl.[7] .......................... H04J 14/02; H04B 10/00
(52) U.S. Cl. ....................................... 359/161; 359/125
(58) Field of Search ............................... 359/125, 126, 359/127, 182, 187, 161

(56) References Cited

U.S. PATENT DOCUMENTS

| | | | |
|---|---|---|---|
| 4,686,667 A | 8/1987 | Ohnsorge | 370/4 |
| 4,712,859 A | 12/1987 | Albanese et al. | 350/96.16 |
| 4,775,210 A | 10/1988 | Fioretti | 350/96.16 |
| 4,871,225 A | 10/1989 | Schembri | 350/96.76 |
| 4,946,244 A | 8/1990 | Schembri | 350/96.16 |
| 5,426,527 A | 6/1995 | Steen et al. | 359/123 |
| 5,528,582 A | 6/1996 | Bodeep et al. | 370/24 |
| 5,825,829 A | * 10/1998 | Borazjani et al. | 375/308 |
| 5,841,468 A | * 11/1998 | Wright | 348/6 |
| 5,990,687 A | * 11/1999 | Williams | 324/529 |
| 6,160,990 A | * 12/2000 | Kobayashi et al. | 455/5.1 |

FOREIGN PATENT DOCUMENTS

| | | |
|---|---|---|
| EP | 0762766 | 3/1997 |
| WO | WO 9943108 | 8/1999 |

OTHER PUBLICATIONS

Cambron, et al., "Bandwidth Management in a Hybrid Fiber Coax Network," *Proceedings of the International Workshop on Community Networking*, 3–7, 1995.

* cited by examiner

*Primary Examiner*—Leslie Pascal
*Assistant Examiner*—Dalzid Singh
(74) *Attorney, Agent, or Firm*—Gray Cary Ware & Freidenrich

(57) ABSTRACT

Systems and methods are described for reverse digitized communications. A method includes: providing at least one optical fiber from at least one member selected from the group consisting of a headend and a hub, a minifibernode coupled to said at least one optical fiber, and an electrical conductor coupled to said minifibernode; transforming a forward optical signal from said at least one optical fiber to a forward analog electrical signal on said electrical conductor at said minifibernode; and transforming a reverse analog electrical signal on said electrical conductor to a reverse digital optical signal at said minifibernode. The systems and methods provide advantages because the need for muxnode units is eliminated, the cost of the node units is reduced, the amount of optical fiber is reduced and the reverse bandwidth is increased.

13 Claims, 4 Drawing Sheets

REVERSE DIGITIZED COMMUNICATIONS ARCHITECTURE

BACKGROUND OF THE INVENTION

1. Field of the Invention

The invention relates generally to the field of communications architecture. More particularly, the invention relates to reverse digitized communications architecture.

2. Discussion of the Related Art

A conventional advanced broadband system typically includes a headend, a muxnode coupled to the headend with an optical fiber, a plurality of nodes coupled to the muxnode in a star configuration with optical fiber and a plurality of end-users (e.g., homes) coupled to each node in a star configuration with coax wire. The forward (downstream) signal (i.e., from headend to muxnode to node to enduser) is always analog. The reverse (upstream) signal from each home to the node level and then to the muxnode level is analog. The reverse signal is digital only above the muxnode level.

A problem with this technology has been that the muxnode units are expensive. What is needed, therefore, is an approach that reduces the cost of the muxnode units. Ideally, such an approach would eliminate the need for any muxnode units.

Another problem with this technology has been that the need to send upstream analog signals from the nodes to the muxnode unit requires the use of expensive lasers at the node level. Therefore, what is also required is solution that allows less expensive lasers to be used at the node level.

Another problem with this technology has been that the star configuration of the nodes requires the use of a relatively large amount of optical fiber. Therefore, what is also required is a solution that uses less optical fiber.

Another problem with this technology has been that the typical advanced broadband system has limited bandwidth, particularly in the reverse direction. What is also needed, therefore, is an approach that increases the reverse bandwidth of advanced broadband systems.

Heretofore, the requirements of eliminating the muxnode units, reducing the cost of the node units, reducing the amount of optical fiber and increasing the reverse bandwidth referred to above have not been fully met. What is needed is a solution that simultaneously addresses all of these requirements. The invention is directed to meeting these requirements, among others.

SUMMARY OF THE INVENTION

A goal of the invention is to simultaneously satisfy the above-discussed requirements of eliminating the muxnode units, reducing the cost of the node units, reducing the amount of optical fiber and increasing the reverse bandwidth which, in the case of the prior art, are not simultaneously satisfied.

One embodiment of the invention is based on a method, comprising: providing at least one optical fiber from at least one member selected from the group consisting of a headend and a hub, a minifibernode coupled to said at least one optical fiber, and an electrical conductor coupled to said minifibernode; transforming a forward optical signal from said at least one optical fiber to a forward analog electrical signal on said electrical conductor at said minifibernode; and transforming a reverse analog electrical signal on said electrical conductor to a reverse digital optical signal at said minifibernode. Another embodiment of the invention is based on A communications system, comprising: at least one optical fiber from at least one member selected from the group consisting of a headend and a hub; a minifibernode coupled to said at least one optical fiber, said minifibernode including a forward circuit and a reverse circuit; and an electrical conductor coupled to said minifibernode, wherein said forward circuit transforms a forward optical signal from said at least optical fiber to a forward analog electrical signal on said electrical conductor and said reverse circuit transforms a reverse analog electrical signal on said electrical conductor to a reverse digital optical signal at said minifibernode. Another embodiment of the invention is based on a kit to provide a reverse digitized kit, comprising a minifibernode to be coupled to at least one optical fiber, said minifibernode including a forward circuit, a reverse circuit, and a connector capable of being coupled to an electrical conductor, wherein said forward circuit transforms a forward optical signal from said at least one optical fiber to a forward analog electrical signal on said electrical conductor and said reverse circuit transforms a reverse analog electrical signal on said electrical conductor to a reverse digital optical signal at said minifibernode.

These, and other goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters (if they occur in more than one view) designate the same parts. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The context of the invention includes advanced broadband service. The context of the invention also includes cable television service.

The invention includes a plurality of minifibernodes coupled to a headend with optical fiber and a plurality of end-users coupled to each minifibernode with coax wire. The forward (downstream) signal (i.e., headend to minifibernode to enduser) is always analog. The reverse signal from each home to the minifibernode level is also analog. Significantly, the invention includes the use of reverse digitalization beginning at the minifibernodes. Therefore, the upstream signal from the minifibernode level (lowest distribution point) to the headend is digital. This is in contrast to the prior art where the upstream signal from the lowest distribution point to the second lowest distribution point is analog.

The reverse digitalization at the minifibernode level allows for the elimination of all muxnode units, thereby saving money. The reverse digitalization at the minifibernode level allows much cheaper lasers to be used in the minifibernodes compared to the alternative where a more expensive laser would be required to send a reverse analog signal upstream from the minifibernodes, thereby saving more money. The reverse digitalization at the minifibernode level also allows efficient 1+1 serial addition of reverse data at the lowest distribution point, thereby increasing reverse bandwidth.

Figure 1:
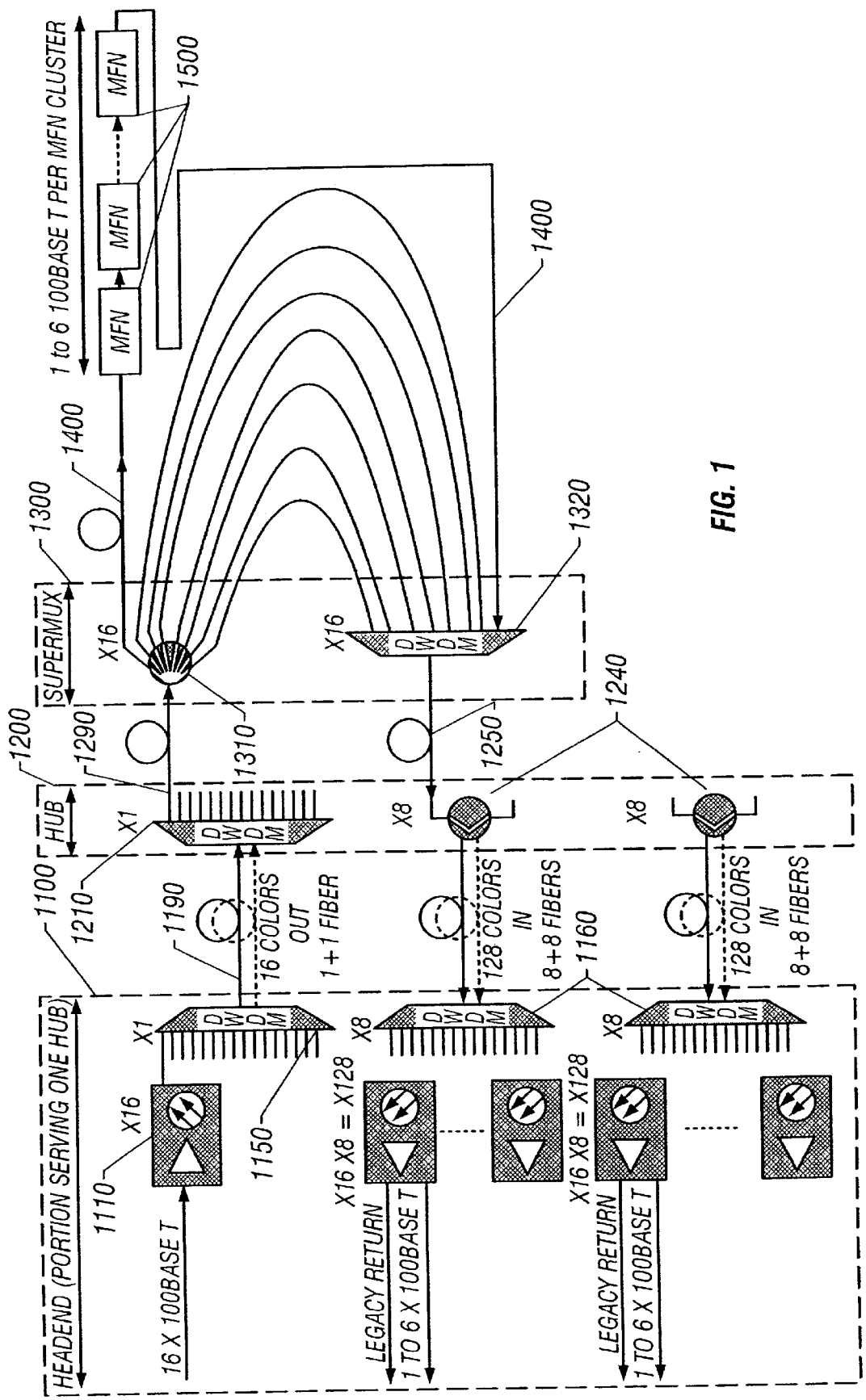
FIG. 1 illustrates a high level schematic view of a communications architecture, representing an embodiment of the invention.

Referring to FIG. 1, a two-way digital overlay and legacy return is shown. A headend portion 1100 serving one hub is coupled to a hub 1200. The hub 1200 is coupled to 16 muxnodes 1300, only one of which is shown in FIG. 1. Of course, there can be more or less muxnodes for each hub. The muxnode 1300 is coupled to 8 branch optical fibers 1400. Of course, there can be a greater or lesser number of optical fiber branches for each muxnode. Each of the branch optical fibers 1400 is coupled to from 1 to 8 minifibernodes 1500, only three of which are shown in FIG. 1. Of course, there can be more than 8 minifibernodes (mFN) for each branch.

The communications system shown in FIG. 1 provides both forward and reverse capability. It is important to appreciate that the system operates differently with respect to the forward and reverse directions. Typically, the forward bandwidth will need to be greater than the reverse bandwidth.

Turning to the forward aspect of the system, the headend portion 1100 can include 16 lasers 1110, only one of which is shown in FIG. 1. The lasers 1110 are coupled to 2 optical fibers 1190 via a dense wavelength division multiplexing unit 1150. The unit 1150 includes resources for performing the dense wavelength division multiplexing function. Each of the optical fibers 1190 can support multiple (e.g., eight in the forward direction) colors. The forward color spacing can be approximately 200 GHz.

At the hub 1200, the optical fibers 1190 are coupled to 16 optical fibers 1290 (only one of which is shown in FIG. 1) via a dense wavelength division multiplexing unit 1210. The unit 1210 includes resources for carrying out the dense wavelength division multiplexing function. In the embodiment shown in FIG. 1, each of the optical fibers 1290 can carry one color.

At the muxnode 1300, each of the optical fibers 1290 is coupled to 8 branch optical fibers 1400 via a splitting unit 1310. It is important to realize that the muxnode is an entirely optional aspect of the invention. The splitting and other functions (shown in the embodiment of FIG. 1 to be part of a muxnode) are preferably part of a simpler branching unit, these functions can even be provided by very simple stand alone physical optics. In the embodiment shown in FIG. 1, each of the branch optical fibers 1400 from a given one of the optical fibers 1290 carries the same color.

Each of the branch optical fibers is coupled to from 1 to 8 minifibernodes 1500. This group of 1 to 8 can be termed a cluster. Each of the minifibernodes 1500 is coupled to a plurality (e.g., approximately 50) of end-users HP (not shown in FIG. 1).

Turning now to the reverse aspect of the system, each of the branch optical fibers 1400 is also coupled to a dense wavelength division multiplexing unit 1320. In the embodiment shown in FIG. 1, the unit 1320 combines the signals from 8 different colors, one for each of the 8 clusters of minifibernodes. The unit 1320 includes resources for implementing the dense wavelength division multiplexing task. Each of the minifibernodes 1500 can transmit reverse signals on a different color, or the reverse signals from the minifibernodes on a branch can be serially added and carried by one color. The reverse color spacing can be approximately 100 GHz. Therefore, it can be appreciated that the reverse colors can be completely different from the forward colors.

It can also be appreciated that the physical layout of the muxnode 1300, branch optical fibers 1400, and minifibernodes 1500 can define a hybrid starloop network. However, the invention is in no way limited to any particular network configuration. For instance, each of the minifibernodes could define a loop sub-network, thereby defining a hybrid loop-loop system. Further, instead of defining loops, the branch optical fibers could be deployed in a linear arrangement, thereby defining a hybrid trunk-star or trunk-loop network. It would even be possible to terminate a branch at the last minifibernode and run the reverse aspect on the same fiber that runs the forward aspect.

The dense wavelength division multiplexing unit 1320 is coupled to one of two dense wavelength division multiplexing units 1240 via 16 optical fibers 1250, only one of which is shown in FIG. 1. The two units 1240 are coupled to a pair of dense wavelength division multiplexing units 1160 via 32 optical fibers 1180, only 4 of which are shown in FIG. 1. Eight receivers 1170 are coupled to each of the units 1160 (i.e., a total of 256 receivers 1170). (Only four of the receivers are shown in FIG. 1).

The invention can be compatible with a multichannel multipoint distribution service (MMDS) standard. The invention can also be compatible with the a local multipoint distribution service (LMDS) standard.

The invention can also be included in a kit. The kit can include some, or all, of the components that compose the invention. More specifically, the kit can include one or more minifibernodes, and other components of the invention. The kit can also contain instructions for practicing the invention and additional resources for carrying out the invention. Unless otherwise specified, the instructions, hardware and/or software of the kit can be the same as those used in the invention.

The invention can also utilize data processing methods that transform signals from analog to digital (A/D) and/or from digital to analog (D/A). The invention can also utilize multiplexing-demultiplexing techniques. The invention can also utilize data processing methods that transform signals from one multiple access standard to another. The invention can also utilize the communications bandwidth provided by the system to carry diagnostic information and/or control commands to actuate interconnected discrete hardware elements. As an example of the former, state variable information representing one or more aspects of the system can be the subject of a system query (e.g., periodically reporting the load on a minifibernode to a control computer at the headend). As an example of the latter, one or more components of the system can be reconfigured by a system command (e.g., sending a command from a control computer at the headend to a minifibernode to transmit reverse digital optical signals at any of various available frequencies).

The term approximately, as used herein, is defined as at least close to a given value (e.g., preferably within 10% of, more preferably within 1% of, and most preferably within 0.1% of). The term coupled, as used herein, is defined as connected, although not necessarily directly, and not necessarily mechanically. The term resources, as used herein, is defined as hardware and/or software for achieving a result. The term program, as used herein, is defined as two or more lines of code that can be executed by a computer.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention. The difference between the examples is in the protection.

Example 1

Figure 2:
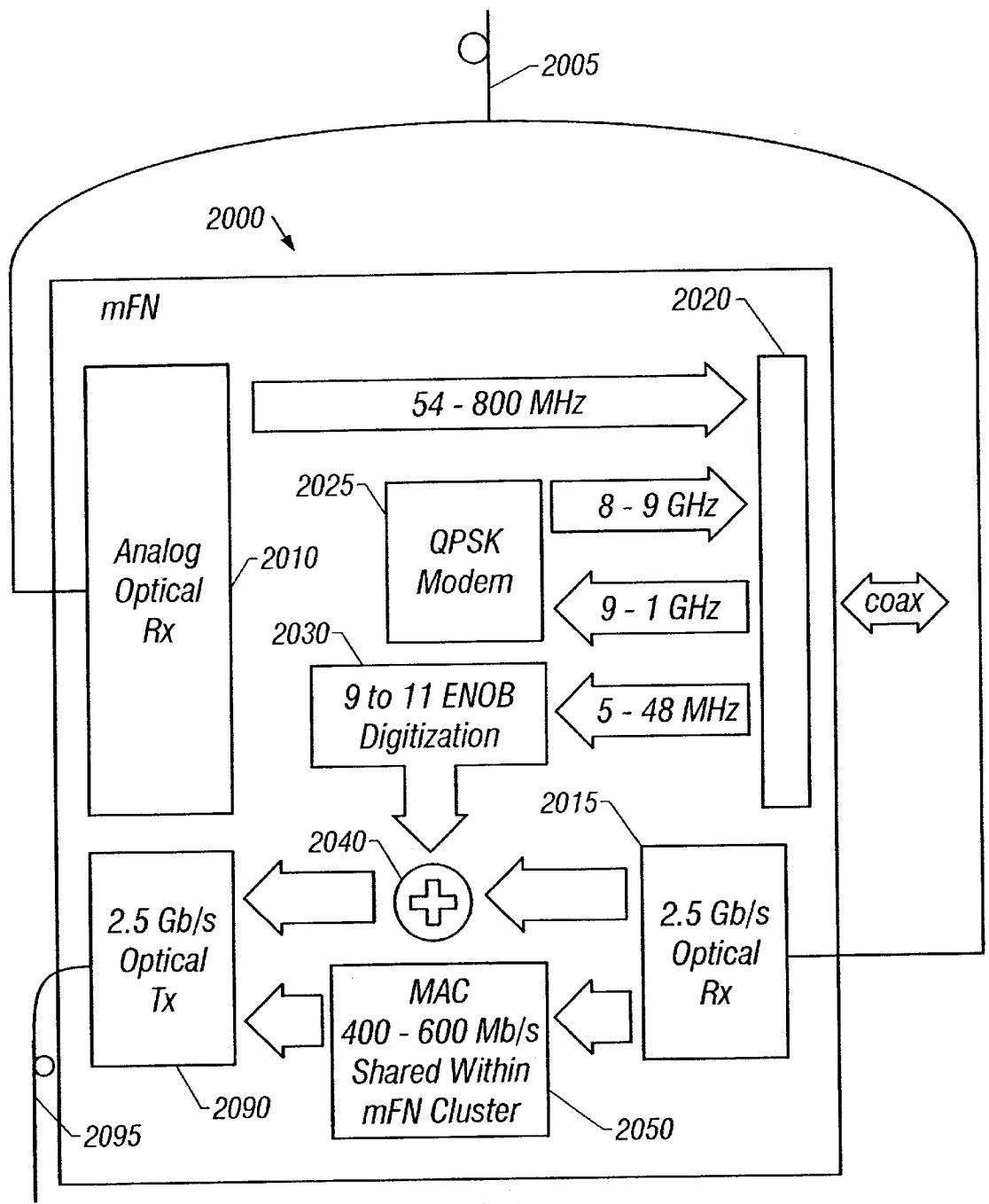
FIG. 2 illustrates a block schematic view of a first exemplary minifibernode, representing an embodiment of the invention.

A first exemplary minifibernode is shown in FIG. 2. A minifibernode 2000 includes an input fiber 2005 and output fiber 2095. The input fiber 2005 is coupled to an analog optical Rx 2010 and a 2.5 Gb/s optical Rx 2015. The analog optical Rx 2010 is coupled to a coax connector 2020 via a 64–800 MHz output link. Of course, the invention is not limited to any particular frequencies. The coax connector 2020 is coupled to a plurality (e.g., approximately 50) end users, not shown in FIG. 2.

The coax connector 2020 is coupled to a quadrature phase shift keying modem 2025 via both a 8–9 GHz output link and a 9–10 GHz input link. The coax connector 2020 is also coupled to a 9 to 11 effective number of bits reverse digitization unit 2030 via a 5–48 MHz input. The reverse digitization units 2030 is coupled to a 2.5 Gb/s optical Tx 2090 via a serial addition unit 2040. The 2.5 Gb/s optical Rx is also coupled to the 2.5 Gb/s optical Tx 2090 via the serial addition unit 2040, as well as via a 400–600 Mb/s data stream 2050 that is shared within the mFN cluster. The digital signal from the reverse comes in from the neighboring minifibernode (aka mininode) and is passed to the next mininode after digitally adding the local information. There is no protection.

Example 2

Figure 3:
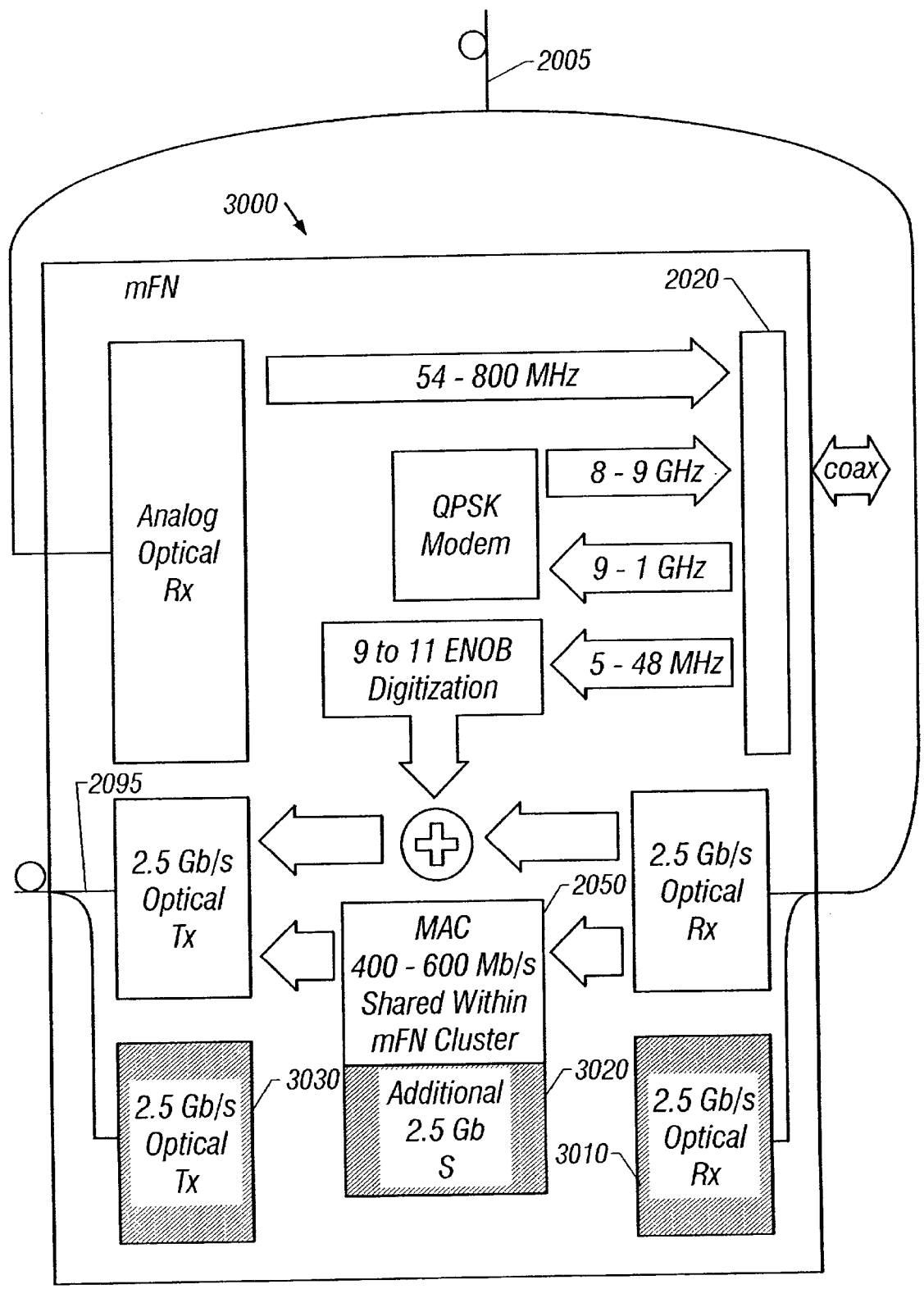
FIG. 3 illustrates a block schematic view of a second exemplary minifibernode, representing an embodiment of the invention.

A second exemplary minifibernode is shown in FIG. 3. A minifibernode 3000 includes the same components as in Example 1, plus the following additional components. Another 2.5 Gb/s optical Rx 3010 is coupled to the optical fiber 2005. An additional 2.5 Gb/s media access control unit 3020 is coupled to the another 2.5 Gb/s optical Rx 3010 and the 400–600 Mb/s media access control 2050. Another 2.5 Gb/s optical Tx is coupled to the additional 2.5 Gb/s media access control unit 3020 and the optical fiber 2095. This example allows for redundant Tx and Rx so that simple equipment redundancy is provided or an additional 2.5 Gb/s data stream can be provided. The second Tx is at a different wavelength.

Example 3

Figure 4:
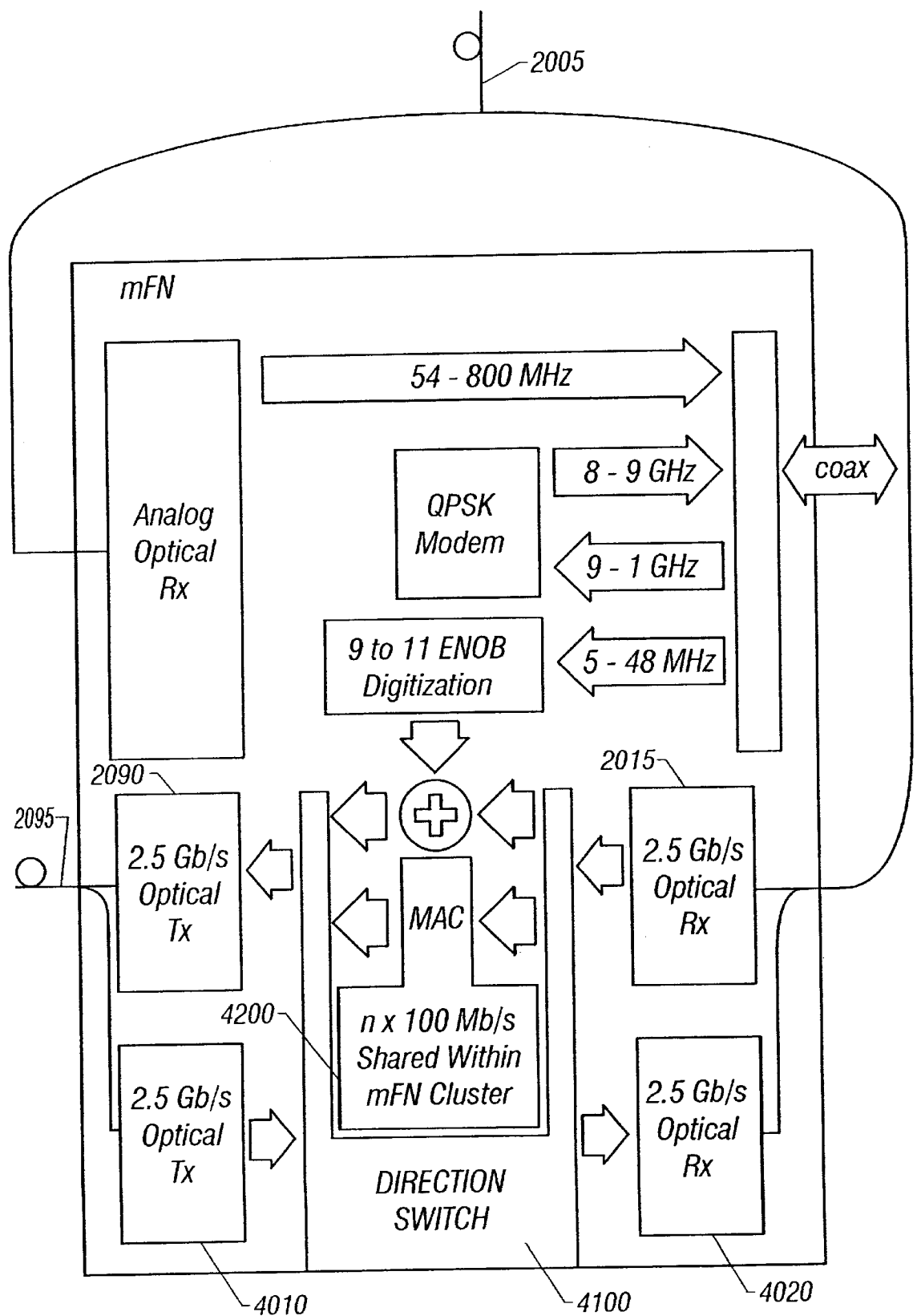
FIG. 4 illustrates a block schematic view of a third exemplary minifibernode, representing an embodiment of the invention.

A third exemplary minifibernode is shown in FIG. 4. A minifibernode 4000 includes the same components as in Example 1, plus the following additional components. Another 2.5 Gb/s optical Rx 4010 is coupled to the fiber 2095 in parallel with the 2.5 Gb/s optical Tx 2090. Another 2.5 Gb/s optical Tx 4020 is coupled to the fiber 2005 in parallel with the 2.5 Gb/s optical Rx 2015. A direction switch 4100 isolated the serial addition unit 2040 from the 2.5 Gb/s optical Rx 2015, the another 2.5 Gb/s optical Rx 4010, the 2.5 Gb/s optical Tx 2090 and the another 2.5 Gb/s optical Tx 4020. A different media access control unit 4200 having n×100 Mb/s shared within the mFN cluster is coupled to the direction switch 4100. The minifibernode 4000 has equipment and route protection. The minifibernode 4000 can sense a fiber cut and send the data in different directions as required.

Practical Applications of the Invention

A practical application of the invention that has value within the technological arts is advanced broadband service. Further, the invention is useful in conjunction with on-demand broadcasting (such as are used for the purpose of interactive television), or in conjunction with internet activities (such as are used for the purpose of world wide web browsing), or the like. There are virtually innumerable uses for the invention, all of which need not be detailed here.

Advantages of the Invention

A communications method and/or system, representing an embodiment of the invention, can be cost effective and advantageous for at least the following reasons. The invention eliminates the need for muxnode units. The invention reduces the cost of the node units. The invention reduces the amount of optical fiber required with the hybrid networks. The invention increases the reverse direction bandwidth.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the minifibernode described herein can be a physically separate module, it will be manifest that the minifibernode may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be

What is claimed is:

1. A method, comprising:

providing at least one optical fiber from at least one member selected from the group consisting of a headend and a hub, a minifibernode coupled to said at least one optical fiber, and an electrical conductor coupled to said minifibernode;

transforming a forward optical signal from said at least one optical fiber to a forward analog electrical signal on said electrical conductor at said minifibernode;

transforming a reverse analog electrical signal on said electrical conductor to a reverse digital optical signal at said minifibernode;

providing another electrical conductor coupled to said minifibernode;

transforming another reverse analog electrical signal on said another electrical conductor to another reverse digital optical signal at said minifibernode; and serially adding said reverse digital optical signal and said another reverse digital optical signal at said minifibernode.

2. A method, comprising:

providing at least one optical fiber from at least one member selected from the group consisting of a headend and a hub, a minifibernode coupled to said at least one optical fiber, and an electrical conductor coupled to said minifibernode;

transforming a forward optical signal from said at least one optical fiber to a forward analog electrical signal on said electrical conductor at said minifibernode;

transforming a reverse analog electrical signal on said electrical conductor to a reverse digital optical signal at said minifibernode;

transmitting said reverse digital optical signal to another minifibernode at a wavelength; and transmitting said reverse digital optical signal from said another minifibernode at another wavelength.

3. A method comprising:

providing at least one optical fiber from at least one member selected from the group consisting of a headend and a hub, a minifibernode coupled to said at least one optical fiber, and an electrical conductor coupled to said minfibernode;

transforming a forward optical signal from said at least one optical fiber to a forward analog electrical signal on said electrical conductor at said minifibernode;

transforming a reverse analog electrical signal on said electrical conductor to a reverse digital optical signal at said minifibernode;

transmitting said reverse digital optical signal to another minifibernode at a wavelength;

sensing a fiber cut; and then transmitting said reverse digital optical signal back to said minifibernode.

4. A method, comprising:

providing at least one optical fiber from at least one member selected from the group consisting of a headend and a hub a minifibernode coupled to said at least one optical fiber, and an electrical conductor coupled to said minifibernode;

transforming a forward optical signal from said at least one optical fiber to a forward analog electrical signal on said electrical conductor at said minifibernode; and transforming a reverse analog electrical signal on said electrical conductor to a reverse digital optical signal at said minifibernode, wherein transforming said reverse analog electrical signal on said electrical conductor to said reverse digital optical signal at said minifibernode includes reverse digitalization that provides analog return and interleaver for additional data streams.

5. A communications system, comprising:

at least one optical fiber from at least one member selected from the group consisting of a headend and a hub;

a minifibernode coupled to said at least one optical fiber, said minifibernode including a forward circuit and a reverse circuit;

an electrical conductor coupled to said minifibernode, wherein said forward circuit transforms a forward optical signal from said at least optical fiber to a forward analog electrical signal on said electrical conductor and said reverse circuit transforms a reverse analog electrical signal on said electrical conductor to a reverse digital optical signal at said minifibernode;

another electrical conductor coupled to said minifibernode, wherein said reverse circuit transforms another reverse analog electrical signal on said another electrical conductor to another reverse digital optical signal at said minifibernode; and another minifibernode coupled to said minifibernode, wherein said reverse circuit transmits said reverse digital optical signal to said another minifibernode at a wavelength.

6. A communications system, comprising:

at least one optical fiber from at least one member selected from the group consisting of a headend and a hub;

a minifibernode coupled to said at least one optical fiber, said minifibernode including a forward circuit and a reverse circuit;

an electrical conductor coupled to said minifibernode, wherein said forward circuit transforms a forward optical signal from said at least optical fiber to a forward analog electrical signal on said electrical conductor and said reverse circuit transforms a reverse analog electrical signal on said electrical conductor to a reverse digital optical signal at said minifibernode; and another minifibernode coupled to said minifibernode, wherein said reverse circuit transmits said reverse digital optical signal to said another minifibernode at a wavelength, wherein said another minifibernode includes another reverse circuit that transmits said reverse digital optical signal from said another minifibernode at another wavelength.

7. A communications system, comprising:

at least one optical fiber from at least one member selected from the group consisting of a headend and a hub;

a minifibernode coupled to said at least one optical fiber, said minifibernode including a forward circuit and a reverse circuit;

an electrical conductor coupled to said minifibernode, wherein said forward circuit transforms a forward optical signal from said at least optical fiber to a forward analog electrical signal on said electrical conductor and said reverse circuit transforms a reverse analog electrical signal on said electrical conductor to a reverse digital optical signal at said minifibernode; and another minifibernode coupled to said minifibernode, wherein said reverse circuit transmits said reverse digital optical signal to said another minifibernode at a wavelength, wherein said another minifibernode includes a sensing circuit and another reverse circuit that can transmit said reverse digital optical signal back to said minifibernode when said sensing circuit detects a fiber cut.

8. A communications system, comprising:

at least one optical fiber from at least one member selected from the group consisting of a headend and a hub;

a minifibernode coupled to said at least one optical fiber, said minifibernode including a forward circuit and a reverse circuit;

an electrical conductor coupled to said minifibernode, wherein said forward circuit transforms a forward optical signal from said at least optical fiber to a forward analog electrical signal on said electrical conductor and said reverse circuit transforms a reverse analog electrical signal on said electrical conductor to a reverse digital optical signal at said minifibernode, wherein said reverse circuit includes a reverse digitalization circuit that provides analog return and interleaver for additional data streams.

9. A kit to provide a reverse digital optical signal, comprising:

a minifibernode to be coupled to at least one optical fiber, said minifibernode including a forward circuit, a reverse circuit, and a connector capable of being coupled to an electrical conductor, wherein said forward circuit transforms a forward optical signal from said at least one optical fiber to a forward analog electrical signal on said electrical conductor and said reverse circuit transforms a reverse analog electrical signal on said electrical conductor to a reverse digital optical signal at said minifibernode;

wherein i) said minifibernode includes another connector capable of being coupled to another electrical conductor and ii) said reverse circuit transforms another reverse analog electrical signal on said another electrical conductor to another reverse digital optical signal at said minifibernode.

10. The kit of claim 9, wherein said reverse circuit serially adds said upstream reverse digital optical signal and said another reverse digital optical signal at said minifibernode.

11. A kit to provide a reverse digital optical signal, comprising:

a minifibernode to be coupled to at least one optical fiber, said minifibernode including a forward circuit, a reverse circuit, and a connector capable of being coupled to an electrical conductor, wherein said forward circuit transforms a forward optical signal from said at least one optical fiber to a forward analog electrical signal on said electrical conductor and said reverse circuit transforms a reverse analog electrical signal on said electrical conductor to a reverse digital optical signal at said minifibernode; and another minifibernode capable of being coupled to said minifibernode, wherein said reverse circuit transmits said reverse digital optical signal to said another minifibernode at a wavelength, wherein said another minifibernode includes a sensing circuit and another reverse circuit that can transmit said reverse digital optical signal back to said minifibernode when said sensing circuit detects a fiber cut.

12. A kit to provide a reverse digital optical signal, comprising:

a minifibernode to be coupled to at least one optical fiber, said minifibernode including a forward circuit, a reverse circuit, and a connector capable of being coupled to an electrical conductor, wherein said forward circuit transforms a forward optical signal from said at least one optical fiber to a forward analog electrical signal on said electrical conductor and said reverse circuit transforms a reverse analog electrical signal on said electrical conductor to a reverse digital optical signal at said minifibernode; and a dense wavelength division multiplexing circuit coupled to said at least one optical fiber.

13. A kit to provide a reverse digital optical signal, comprising;

a minifibernode to be coupled to at least one optical fiber, said minifibernode including a forward circuit, a reverse circuit, and a connector capable of being coupled to an electrical conductor, wherein said forward circuit transforms a forward optical signal from said at least one optical fiber to a forward analog electrical signal on said electrical conductor and said reverse circuit transforms a reverse analog electrical signal on said electrical conductor to a reverse digital optical signal at said minifibernode, wherein said reverse circuit includes a reverse digitalization circuit that provides analog return and interleaver for additional data streams.

* * * * *

UNITED STATES PATENT AND TRADEMARK OFFICE
CERTIFICATE OF CORRECTION

PATENT NO.    : 6,452,708 B1
DATED         : September 17, 2002
INVENTOR(S)   : Guy Sucharczuk et al.

It is certified that error appears in the above-identified patent and that said Letters Patent is hereby corrected as shown below:

<u>Column 8,</u>
Line 4, insert -- , -- after the word "hub"

<u>Column 9,</u>
Line 4, delete "." after the word "minifibernode" and insert -- , -- instead.
Line 6, insert -- one -- after the word "least" and before the word "optical".

Signed and Sealed this

Twenty-eighth Day of January, 2003

JAMES E. ROGAN
*Director of the United States Patent and Trademark Office*